United States Patent [19]

Forsyth

[11] 4,008,800
[45] Feb. 22, 1977

[54] CHAIN DRIVEN ROLLER CONVEYOR WITH CLOSURE PLATES

[75] Inventor: Emil John Forsyth, Danville, Ky.

[73] Assignee: Rexnord Inc., Milwaukee, Wis.

[22] Filed: Nov. 26, 1975

[21] Appl. No.: 635,565

[52] U.S. Cl. .................................. 198/782; 198/860
[51] Int. Cl.² ........................................ B65G 13/11
[58] Field of Search ............... 198/127 R, 203, 204, 198/780, 782, 860, 862; 52/596

[56] References Cited

UNITED STATES PATENTS

| | | | |
|---|---|---|---|
| 1,896,150 | 2/1933 | Zademach | 198/127 R |
| 2,712,377 | 7/1955 | Eggleston | 198/127 R |
| 2,765,065 | 10/1956 | Liebelt | 198/127 R X |
| 2,836,284 | 5/1958 | Gilliatt | 198/127 R |
| 3,327,837 | 6/1967 | Covell | 198/127 R |
| 3,344,903 | 10/1967 | Holm | 198/127 R |
| 3,568,821 | 3/1971 | Gronkvist | 198/127 R |
| 3,581,878 | 6/1971 | Jacobson | 198/204 |
| 3,729,088 | 4/1973 | Stein et al. | 198/127 R |
| 3,895,706 | 7/1975 | Levin et al. | 198/127 R |

FOREIGN PATENTS OR APPLICATIONS

| | | | |
|---|---|---|---|
| 896,632 | 11/1953 | Germany | 198/204 |
| 1,506,968 | 7/1969 | Germany | 198/127 R |

*Primary Examiner*—Evon C. Blunk
*Assistant Examiner*—Richard K. Thomson

[57] ABSTRACT

Each side frame of a roll conveyor includes a series of holes in which the projecting ends of the roll axles are selectively mounted according to the desired spacing between rolls. One side frame forms a chain box which partially encloses the chain drive of the roll. Separate plates are provided to fully close the box. They are in certain lengths whereby only several groups need be provided for their use in closing the chain box of any conveyor of whatever roll spacing it may have, within limits.

8 Claims, 8 Drawing Figures

CHAIN DRIVEN ROLLER CONVEYOR WITH CLOSURE PLATES

BACKGROUND OF THE INVENTION

The rolls of a roll conveyor are spaced according to the length of the articles to be conveyed. Generally their spacing is such that each article always has the support of at least two or three rolls. Accordingly, the term "roll spacing" refers to the center-to-center distance between rolls, rather than the "gap" between rolls which depends on their diameter and "spacing."

Each roll is bearing mounted on an axle having projecting ends which are fitted in the opposite corresponding holes of the side frame members of the conveyor and which support the rolls.

At least one end of the axle is retractable to allow the roll to be located between the spaced frame members for mounting in the opposite holes. Such rolls may also be readily removed individually for replacement.

Where the side frame members are punched so that the same frame members may be used in the construction of a conveyor of any selected roll spacing, the spacing of the rolls of a conveyor may later be altered, if desired such as to provide in a given section of the conveyor more rolls of closer spacing. In order to provide the desired increments of selection, the hole spacing is most practicably such that the rolls with minimum spacing would be assembled in every third hole, for example. Other spacing increments are, of course, optional.

It is an object of the invention to provide readily installed means for fully closing the chain box of any such conveyors, irrespective of the spacing of such rolls.

SUMMARY OF THE INVENTION

One side frame of the usual roll conveyor having chain driven rolls forms a chain box. The driven ends of the rolls extend into this box through an opening or gap which extends the length of the frame or box. Separate plates are provided to fully close the box. They are in certain lengths whereby only several groups need be provided for their use in closing the chain box of any conveyor of whatever roll spacing it may have, within limits.

DETAILED DESCRIPTION OF THE PREFERRED EMBODIMENT

Figure 1:
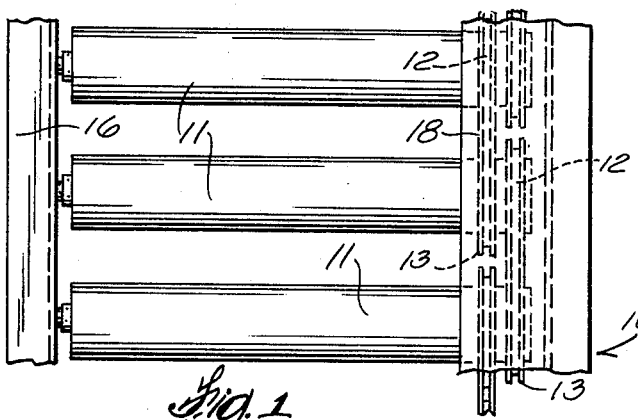
FIG. 1 is a plan view of a partial length of a conveyor.
Figure 2:
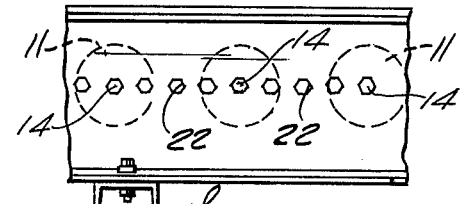
FIG. 2 is a side view of the conveyor of FIG. 1
Figure 3:
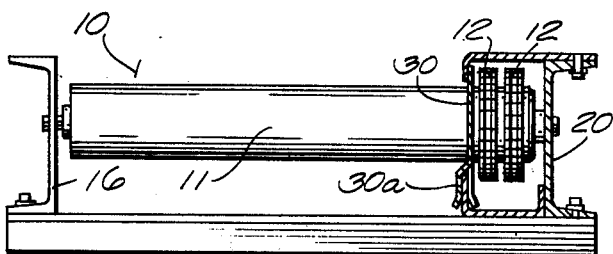
FIG. 3 is a vertical cross-section of the conveyor of FIG. 1.
Figure 8:
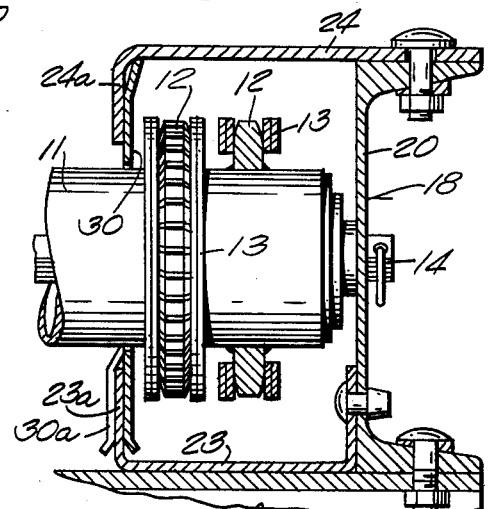
FIG. 8 is a further enlarged vertical cross-section of the chain box as it appears in FIG. 3.

The conveyor 10 only shown in part, includes a series of rolls 11 on which an article is transported by the rotation of the rolls. The sprockets 12 at one end of each roll are engaged by chains 13. Chains such as chains 13 interconnect the adjacent rolls or a series of rolls and a drive chain, not shown, effects the rotation of the entire series as required.

Each roll 11 is rotatable on an axle 14 having projecting ends. In a conventional construction, such axles are of a hexagonal cross-section.

The ends of the axles 14 project from the rolls and are assembled in corresponding holes provided in the parallel side frames 16 and 18 for the support of the rolls. Side frame 16 as shown is identical to the channel 20 which forms a part of the side frame 18. Side frame 16 and channel 20 are each provided with a series of holes 22 for the corresponding projecting ends of the axles as described. For references purposes, the spacing between holes is S.

Side frame 18 which includes the channel 20 further includes the lower pan 23 and the upper plate 24. Plate 24 and pan 23 extend over and under the chain 13 and are formed with the vertical flanges 24a and 23a respectively which extend toward each other with the rolls 11 disposed immediately therebetween. The side frame 18 thus forms a protective enclosure or chain box for chain 13 and sprockets 12 which is open only between rolls 11. The plates 30, 31 and 32 of the present invention provide the full closure this chain box as will be described.

Plates 30, 31 and 32 are of similar stamped sheet metal construction and are adapted to fit across the space or gap between flanges 23a and 24a. In the preferred form, as shown, they include the lower clips 30a, 31a, and 32a which are struck from the plates so that the lower margins of the plates fit over flange 23a. The upper margins of the plates are adapted to extend up to and behind flange 24a of plate 24. Plates 30 and 31 are also provided with the round holes 30b and 31b through which any of rolls 11 may extend with only a suitable clearance. Plates 32 do not include such holes.

The lengths of plates 30, 31 and 32 are each a multiple of the spacing S of holes 22 such that selected plates may be assembled according to the spacing of rolls 11 to provide the full closure of the chain drive housing. The length of plates 30 is 3S; that of plates 31 is 5S; that of plates 32 is 3S.

Figure 5:
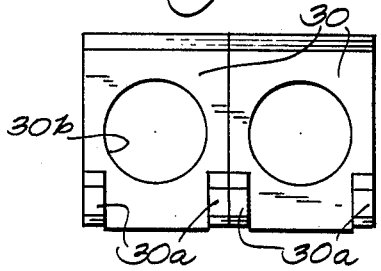
FIG. 5 shows a series of plates selected from a group which provides for minimum roll spacing, having reference to the conveyor of FIGS. 1–3.

Thus if the center-to-center spacing between rolls is 3S, plates 30 are selected as shown in FIG. 5.

Figure 4:
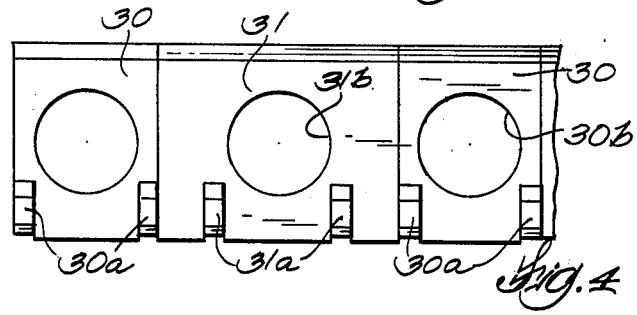
FIG. 4 shows the series of plates closing the chain box of the conveyor of FIGS. 1–3. The figure is slightly enlarged in scale.

If the roll spacing is 4S, plates 30 and 31 are selected and alternately arranged as shown in FIG. 4.

Figure 6:
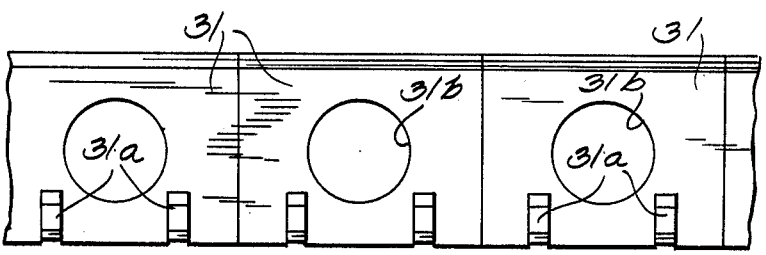
FIG. 6 shows a series of plates for a relatively wider roll spacing.

If the roll spacing is 5S, plates 31 are selected as shown in FIG. 6.

If the roll spacing is 6S, plates 30 and 32 are selected and alternately arranged.

Figure 7:
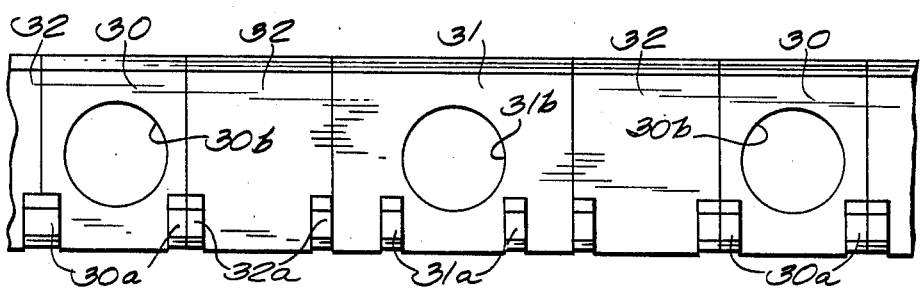
FIG. 7 shows a series of plates with alternate blank plates which provides an exceptionally greater spacing.

If the roll spacing is 7S, plates 32 are placed intermediate the plates 30 and 31 which are alternately arranged as shown in FIG. 7.

The above selections are further shown in the tabulation below and which is extended to the general practical limits of roll spacing S. With reference thereto:

If the roll spacing is 8S, plates 31 are assembled on the rolls and are spaced by plates 32.

If the roll spacing is 9S, two plates 32 are used intermediate plates 30 which are assembled on the rolls.

If the roll spacing is 10S, plates 30 and 31 are assembled on alternate rolls and the plates assembled on adjoining rolls are spaced by two plates 32.

If the roll spacing is 11S, plates 31 are assembled on the rolls and are spaced by two plates 32.

| Roll Spacing | Roll Plate | Spacer (1 or 2) | Roll Plate | Spacer | Roll Plate |
|---|---|---|---|---|---|
| 3S | 30 | — | 30 | — | 30 |
| 4S | 30 | — | 31 | — | 30 |
| 5S | 31 | — | 31 | — | 31 |
| 6S | 30 | 32 | 30 | 32 | 30 |
| 7S | 30 | 32 | 31 | 32 | 30 |
| 8S | 31 | 32 | 31 | 32 | 31 |
| 9S | 30 | 32(2) | 30 | 32(2) | 30 |
| 10S | 30 | 32(2) | 31 | 32(2) | 30 |
| 11S | 31 | 32(2) | 31 | 32(2) | 31 |

It should be understood, of course, that further roll spacing may be accommodated with three or more intermediate plates of 3S width. The plates 30, 31 and 32 as shown and described are of sheet metal but the plates may instead be of other constructions, including but not limited to, a molded plastic construction.

It may be noted that the distance between the clips 30a, 31a and 32a are the same for all plates and that the differences between plates are only in their length and the omission of the center hole. Such plates may thus be readily manufactured or molded in quantity with only slight changes in tooling.

I claim:

1. In a power driven roller conveyor, in combination, spaced parallel side frames; a series of rollers mounted between said side frames; power means for driving said rollers disposed along one set of ends of the rollers; a plurality of spaced support means associated with said side frames for receiving and supporting the axles of said rollers, said support means spaced a distance S apart along the side frames; spaced members projecting from one of said side frames over and below said drive means and the one set of ends of the rollers; and a plurality of removable abutting plates positioned against the ends of said spaced members and enclosing the drive means, at least a portion of the abutting plates having holes through which the rollers may extend, the width of said abutting plates being a multiple of S thereby permitting changes in the center-to-center spacing of the roller in multiples of S.

2. In the combination of claim 1, the abutting plates have a width of a first predetermined multiple of S and the center-to-center spacing of the rollers is a second predetermined multiple of S.

3. In the combination of claim 2, a plurality of groups of abutting plates, a first group having holes through which the rollers may extend and a second group of plates, at least one of which is positioned between adjacent plates of the first group and having uninterrupted surfaces.

4. In the combination of claim 1, a plurality of groups of abutting plates, one of the groups having a width a first predetermined multiple of S and a second of the groups having a width a second predetermined multiple of S, said rollers having a center-to-center spacing which is a third predetermined multiple of S.

5. In the combination of claim 4, said first and second groups having holes through which the rollers may extend and a third group of abutting plates, at least one of which is positioned between adjacent plates of the first and second groups.

6. In a power driven roll conveyor comprising parallel spaced rolls and spaced parallel side frames, one side frame being of box section which partially encloses the ends of the rolls, said rolls having a center-to-center spacing which is a multiple of S wherein 3S is the minimum spacing between rolls, and groups of plates for assembly in a series with said box section for closing the latter, said groups including first and second groups of plates of 3S and 5S width, respectively, each such plate having a central hole through which a roll may extend, and a third group of plates of 3S width, said groups of plates providing the entire required selection of plates for assembly in a series to close the box section.

7. In a power driven roller conveyor comprising parallel spaced rolls and spaced parallel side frames having aperture means for receiving the projecting ends of the axles of the rollers, one side frame being of box section which encloses the ends of the rolls, said rolls having a center-to-center spacing which is a multiple of S, where S is the distance between adjacent aperture means, said multiple being more than 3, said one side frame including removable plates assembled in a series and having holes through which the rolls extend, said plates including first and second groups of plates of 3S and 5S width, respectively each such plate having a central hole through which a roll may extend, and a third group of plates of 3S width, said group of plates providing the entire required selection of plates for assembly in a series to close the box section.

8. In a power driven roll conveyor comprising parallel spaced rolls and spaced parallel side frames, one side frame being a box section which includes a series of removable plates and which encloses driven ends of the rolls with rolls extending through at least some of the plates, a plurality of spaced means for mounting the ends of the rolls to and between said side frames such that the rolls may be arranged or rearranged to have any spacing between 3S and 11S, where S is the distance between adjacent mounting means, said plates including a first number of 3S width and having holes through which the rolls may extend, a second number of 5S width and having holes through which such rolls may extend, and a third number of 3S width such that said numbers of plates may be suitably arranged and rearranged as required by any spacing of the rolls within said limits.

* * * * *